United States Patent [19]
Davis

[11] 3,802,067
[45] Apr. 9, 1974

[54] METHOD OF INSERTING STRIPS IN SLOTS
[75] Inventor: Fred R. Davis, Lima, Ohio
[73] Assignee: Gasdorf Tool & Machine Company, Inc., Lima, Ohio
[22] Filed: Jan. 4, 1973
[21] Appl. No.: 320,980

Related U.S. Application Data
[62] Division of Ser. No. 159,338, July 2, 1971, Pat. No. 3,727,287.

[52] U.S. Cl............... 29/596, 93/1 R, 93/1 WZ, 310/214, 310/215
[51] Int. Cl. .......................................... H02k 15/00
[58] Field of Search............. 29/596, 205 E, 205 R; 93/1 R, 1 G, 1 WZ; 310/214, 215

[56] References Cited
UNITED STATES PATENTS
| | | | |
|---|---|---|---|
| 3,643,317 | 2/1972 | Arnold et al. | 29/205 E |
| 3,514,836 | 6/1970 | Mason | 29/205 E |
| 3,703,854 | 11/1971 | Schlaudroff | 29/205 E |

Primary Examiner—Charles W. Lanham
Assistant Examiner—Carl E. Hall

[57] ABSTRACT

A method of inserting strips in cell slots including the steps of feeding a strip, cutting the strip, inserting the strip, rotatably supporting the strips, transferring the strips, and moving the strips into the core slots of a motor.

9 Claims, 7 Drawing Figures

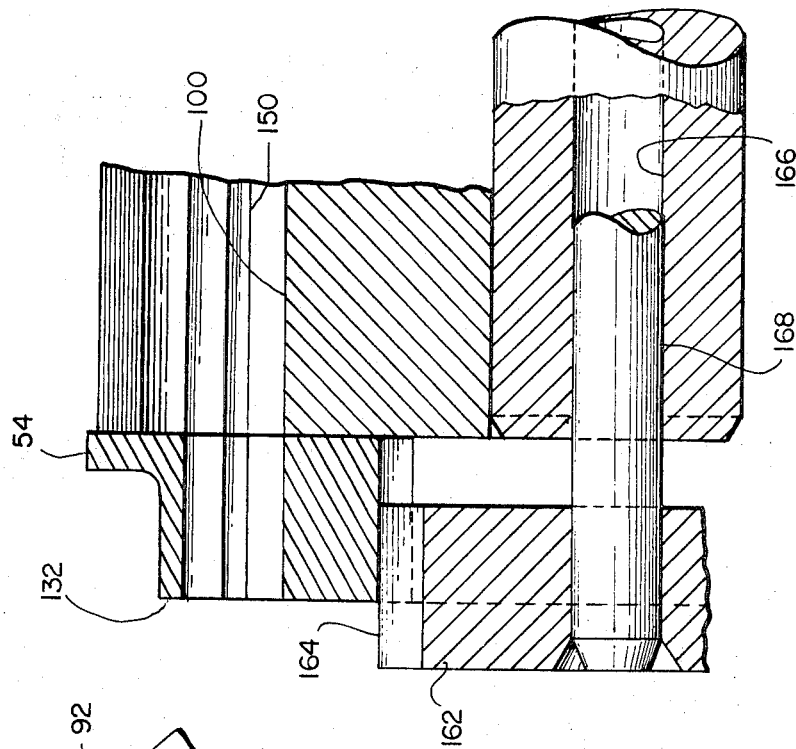
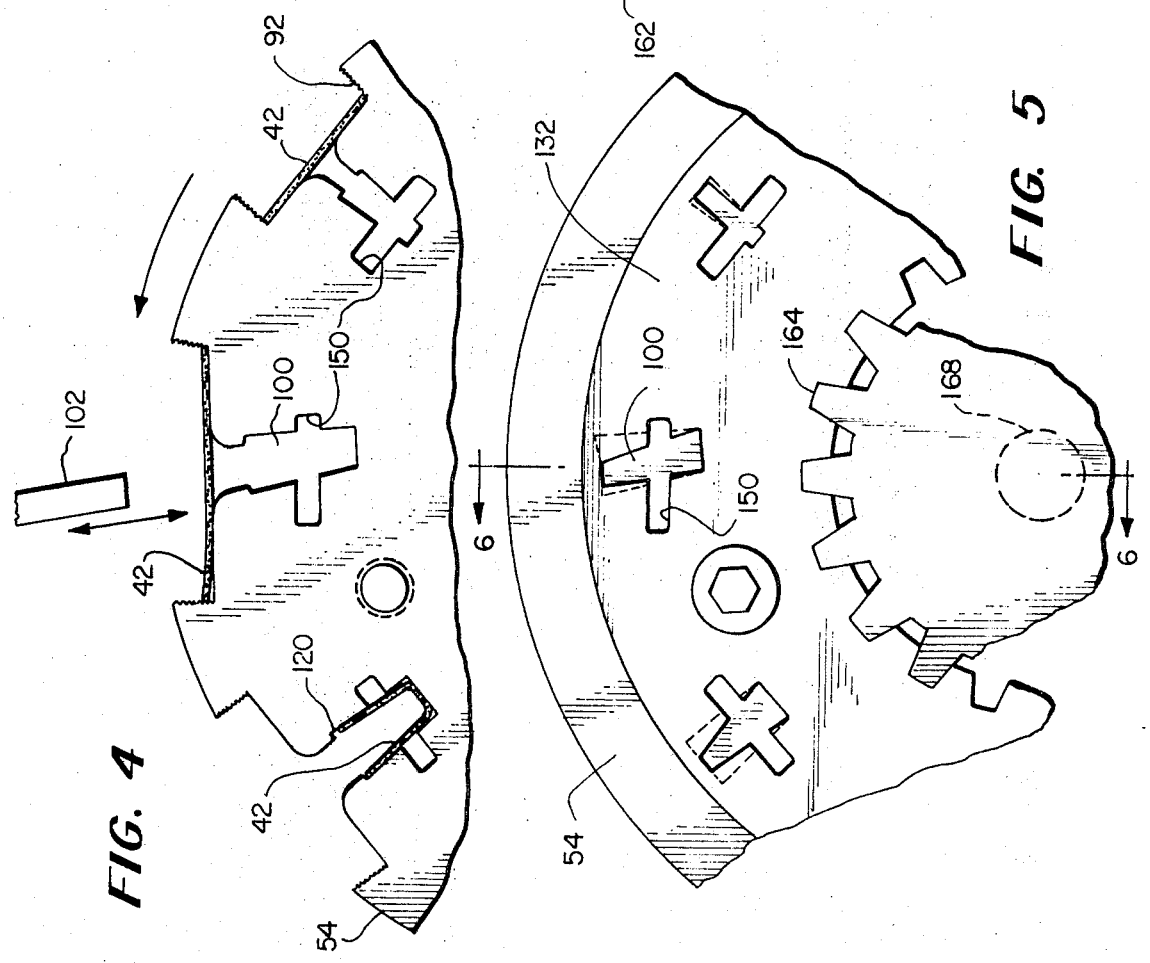

METHOD OF INSERTING STRIPS IN SLOTS

The present application is a division of my co-pending application Ser. No. 159,338, filed July 2, 1971 now U.S. Pat. No. 3,727,287 and entitled "Cell Inserting Machine".

Heretofore, machines have been built to make and insert cells of uniform shape and size only for insertion into uniform core slots radially disposed with respect to the central axis of the core of the motor. In all cases the core has been clamped or secured in position before the operation begins and the cells are made and inserted in succession, the core being indexed through one slot angle until all slots are filled. On completion of the filling operation, the machine stops and the core is removed. Unfortunately, machines operating on the above principle cannot meet the irregular slot and high production rate requirements of modern industry. The need to get the most power out of the smallest core package has forced small (single phase) motor designers to use cores having non-uniform, irregular shaped slots disposed, not radially, but at non-uniform angles departing as much as 15° from radial.

Existing machines and improvements thereon have been unsuccessful in inserting cells in the irregular slot motors. They have been either slow, inefficient, or expensive due to the requirement of continual maintenance. Due to the fact that there was no techanical advance in machinery to insert cells into these irregular slots, industry began using an epoxy coating on cores instead of inserted insulation cells. In the long run this proved to be expensive due to the high percentage of faulty coatings, and the improved machine herein disclosed has been conceived and put into operation to fill the gap in becoming the only practical alternative in achieving core slot insulation for electric motors.

Accordingly, a primary object of this invention is the provision of means for producing and inserting irregular shaped insulator strips or cells in irregular shaped core motor slots.

Another object of this invention is a simple, inexpensive, and rapid operation facilitating a high rate of production of inserted cells.

The above and numerous other objects of this invention will become apparent to those skilled in the art after a detailed description of preferred embodiments of this invention taken together with the accompanying drawing wherein:

FIG. 4 is a blown up front end elevational view of a portion of the forming drum;

FIG. 5 is a front end elevational (outer part of gear added,) view of the forming drum of FIG. 4;

FIG. 6 is a sectional view taken on line 6—6 of FIG. 5; and

FIG. 7 is a slot outline of a lamination from a portion of a motor core.

Figure 1:
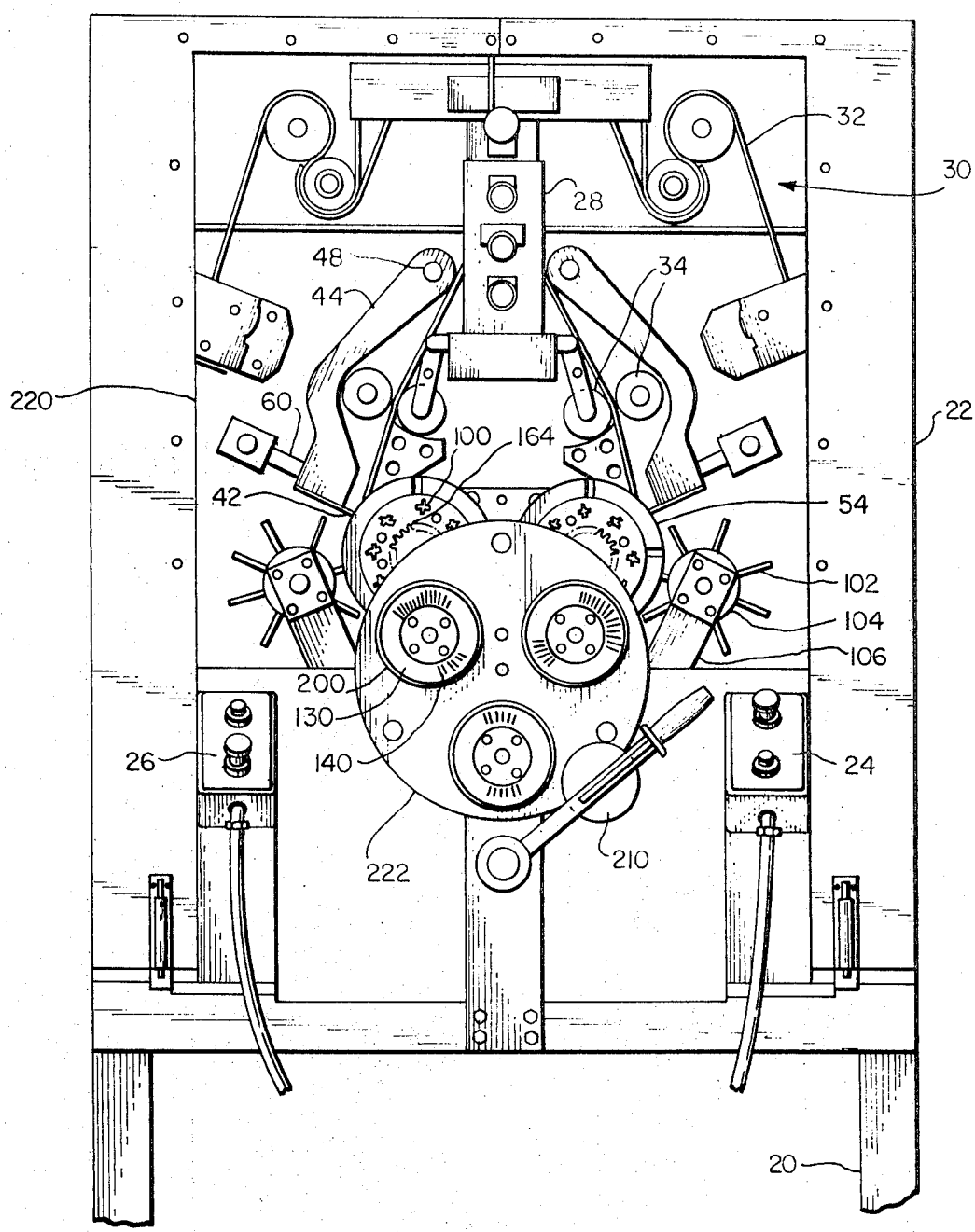
FIG. 1 is a front elevational view of the machine.

Referring in detail to the drawings, there is shown in FIG. 1 a machine support 20 and housing 22 having control boxes 24, 26 and 28 for connecting the various mechanisms of the machine to a source of power (not shown).

A roller arrangement 30 is mounted near each side of housing 22 at the top thereof for feeding a continuous strip 32 of insulating material past a pair of feed rolls 34 in an intermittent manner by means of a ratchet mechanism (not shown).

Figure 2:
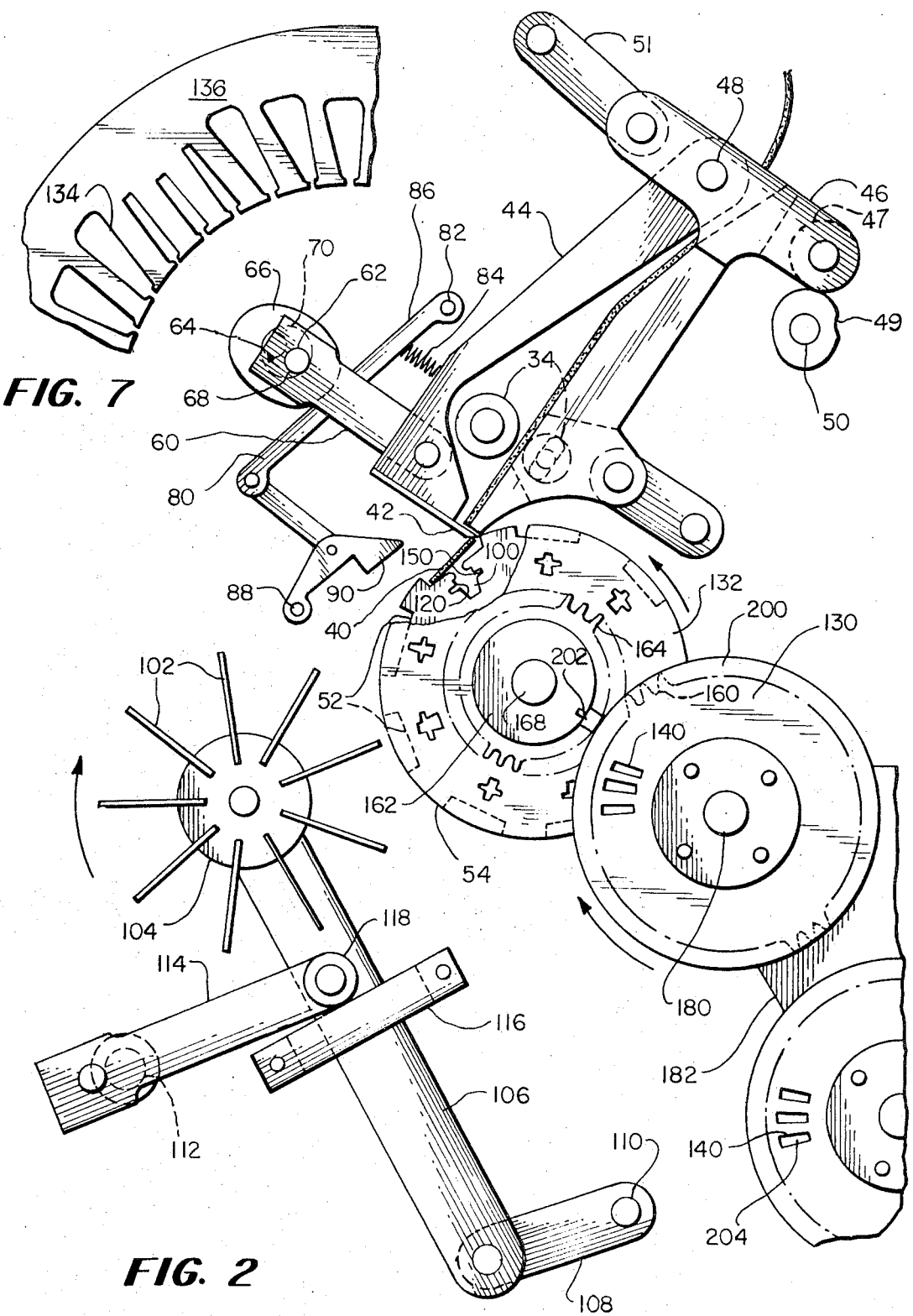
FIG. 2 is a blown up elevational view of a portion of the mechanism as the cell is being cut.

As clearly shown in FIG. 2, a cell 40 is cut off the end of insulating strip 32 by means of a shear 42. Shear 42 is attached to the end of an arm 44 which is pivotally secured to an element 46 at a pivot point 48. An irregularly shaped cam 49 mounted on a rotatable shaft 50 physically engages element 46 in order to intermittently regulate forward and backward movement of shear 42 with pivotally movable linkage 51 and element 46 for cutting cell 40 to the exact size so that the length thereof will mate with the varying length of each groove 52 in an intermittently rotating drum 54.

At the end opposite pivot point 48, arm 44 is pivotally connected to a link 60 which is in turn connected to a crank pin 62 extending from the end of a rotatable shaft 70. As shaft 70 rotates through a 360° cycle, pin 62 lifts and lowers link 60 between positions 68 and 64 (dotted) thereby causing shear 42 to raise and lower to intermittently cut off cell 40 as drum 54 rotates to the proper angle for one of the grooves 52 to receive a cell 40.

Linkage 80 connected at pivot point 82 within housing 22 is in pressed engagement with a spring 84 extending from arm 44. Cam 66 is in slidable engagement with the top surface 86 of linkage 80 in order to pivot linkage 80 counterclockwise about pivot point 82 against spring 84 during each cycle of rotation of cam 66. Pivotally connected between linkage 80 and a pivot point 88 is a stopper 90 which presses cell 40 down into groove 52 (see FIG. 3) immediately after it has been cut off from strip 32 by shear 42. As clearly shown in FIG. 4, the sides 92 of each groove 52 are serrated to insure that cells 40 will be held in grooves 52 during movement of drum 54 due to the fact that the insulating material of strip 32 will normally be of a springy nature that could easily pop out of groove 52 and due to the fact that cell 40 might fall out because of gravity before the next operation of the apparatus as drum 54 rotates cell 40 downward past the center plane of drum 54, FIG. 3.

Directly below each groove 52 is a forming slot 100. A plurality of blades 102 radially extend from a slotted drum (FIG. 3) 104 rotatably mounted at the end of an arm 106 pivotally attached to a link 108 secured to a pivot point 110 in housing 22. A rotating crank 112 connected to arm 106 by means of a link 114 for moving a blade 102 into a slot 100 during each cycle of crank 112 rotation. Where necessary, the angle of a track 116, adjustably mounted on housing 22, may be adjusted so that the roller 118 at the end of link 114 engaging track 116 will cause each blade 102 to enter each irregularly shaped slot 100 at the precise angle. For this purpose, the angle of track 116 may be cam controlled (not shown) for each different slot 100 that a blade 102 is to enter in the same manner as element 46 is cam controlled by cam 49 so that shear 42 will cut off a section of strip 32 exactly at the rear or top edge of each groove 52 of varying length. As blade 102 enters slot 100, it pushes cell 40 to the bottom of slot 100 and gives it a generally U-shaped form, as clearly shown in the left hand slot 100 of FIG. 4. As blade 102 retracts from slot 100, cell 40 is held within slot 100 by means of ledges 120 overhanging the bottom portions of the side walls of slot 100.

In order to insert cell 40 into a motor core slot, cell 40 is first transferred into a rotatable holding magazine (FIG. 3) 130 in front of drum 54. As clearly shown in FIG. 5, each slot 100 is tapered with the side walls thereof gradually forming a narrower space at the front face 132 of drum 54. Thus, the original shape of slot 100 (as shown in dotted outline in FIG. 5) has now become a narrower and different angular shape (as shown in solid line in FIG. 5) conforming exactly to the shape of the specific slot 134 of the motor core 136 in which cell 40 is to be inserted as illustrated in FIG. 7. Magazine 130 has a plurality of slots 140 therein corresponding in exact shape to the tapered slots 100 at surface 132. Slots 140 correspond in exact shape, distance from each other, and number as slots 134. Each slot 100 has a horizontal recess 150 in each side wall thereof. As drum 54 and magazine 130 intermittently rotate, each time slot 100 is aligned with slot 140, a flat bar or push rod 152 slides within the space formed by recesses 150 from the rear of drum 54 to front face 132 causing cell 40 to take on a narrower shape due to the taper of slot 100 as cell 40 is pushed toward front face 132 and subsequently out of slot 100 into mating slot 140 immediately adjacent front face 132. Thus, the rough "U" shape of cell 40 now has the exact shape necessary to be inserted in the corresponding core motor slot due to the sliding of cell 40 through the tapered slot 100. Drum 54 and magazine 130 are rotatably aligned with each other by means of gear teeth 160 on magazine 130 meshing with a retractible gear 162 with teeth 164 slidably mounted within a bore 166 at the front end of drum 54 by means of a rod 168.

Figure 3:
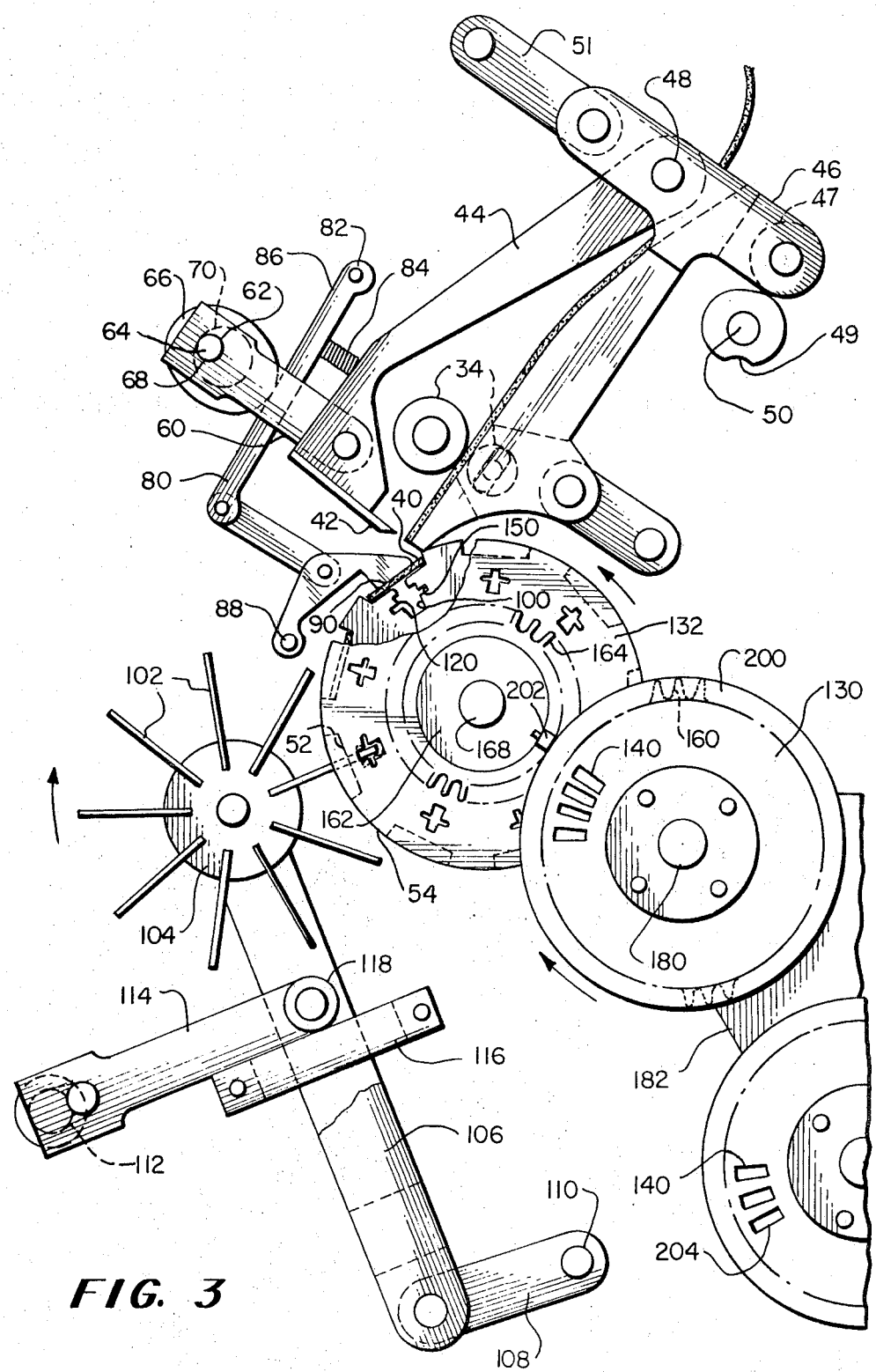
FIG. 3 is a blown up view of FIG. 2 as the cell is being inserted in the slot.

As shown in FIG. 1, cells 40 are formed in two intermittently (by Geneva motion) rotating drums 54. Since motor cores 136 normally have 36 slots 134, nine slots 100 are provided in each drum 54 so that a maximum of 18 different shapes can be provided. One drum 54 produces cells 40 for odd numbered slots and the other drum 54 produces cells 40 for even numbered slots 134 with each drum 54 making two revolutions per cycle of the machine. Cells 40 are transferred to two of three rotating magazines 130. Magazine 130 is first half filled from drum 54 as shown in FIGS. 2 and 3, and is then rotated to have the other half of its slots 140 filled from the other drum 54. Magazines 130 are mounted upon equally spaced axles 180 secured to a triangular plate 82 which rotates magazines 130 through an angle of 120° at the end of each filling cycle.

With nine slots 100, each drum 54 rotates in increments of 40° and fills every other slot 140 of magazine 130 during two revolutions of drum 54. As already mentioned, when the left hand drum 54 has filled 18 alternate slots 140 of magazine 130, magazine 130 will move from the left hand position 120° over to the top right hand position to have the other half of slots 140 filled by the right hand drum 54. After magazine 130 has 18 slots 140 filled by one of drums 54, gear 162 is retracted to permit rotation of magazines 130. As the upper left hand magazine 130 is being half filled, the upper right hand magazine 130 is being completely filled and the bottom magazine 130 is having cells 40 that were completely filled in the upper right hand position ejected into the slots 134 of a motor core 136 placed in position in front of magazine 130 by the machine operator.

Thus, there is disclosed herein a one, two, three system of operation where cells 40 are being continuously produced, formed, transferred, and ejected into slots of motor cores. Since only 18 cells 40 are required to be produced per cycle, the cycle time per core is reduced substantially to one-half of that which would be required by the full compliment of cells 40 from a single drum 54. It should be noted that a locking ring 200 disengages gear teeth 60 when locking ring 200 is pressed outward by the action of gear 162 against a cam follower 202 secured to the side of locking ring 200. An ejector assembly (not shown) is positioned so that a plurality of push rods 204 are slidably insertable within the 36 slots 140 of each magazine 130 which is in the bottom position ready to have cells 40 ejected into motor core slots 134. Push rods 204 are shaped to correspond with and fit the 36 magazine slots 140, and all push rods 204 are simultaneously actuated by an air cylinder (not shown) secured within housing 22. A swinging clamp 210 is utilized for automatically clamping motor core 136 while cells 40 are ejected into it, and release core 136 when this operation is completed.

It should be noted here that each blade 102 is of a specific shape for different shaped slots 100. Thus nine different shaped blades 102 on the left and right hand rotating drums 104 allow a possible maximum of 18 different slot shapes.

Shown in FIG. 1 is a transparent guard 220 and a transparent guard 222 rotatable with magazines 130 allowing access to the machine.

While preferred embodiments of this invention have been illustrated and described, it should be understood that many changes and modifications may be restored to without departing from the spirit and scope of the invention. For instance, when a high rate of production is not required, a single rather than the dual type machine described herein may be employed using only one insulating strip 32, a single cutting mechanism and shear 42, a single drum 54, and only two magazines 130 mounted diametrically opposed from each other on a straight bar. The sequence of the operation would be the same except that there would be no skipping of slots in magazines 130. Drum 54 would make twice the number of complete turns as it would in the dual type machine herein described. In either machine, the number of the slots in drum 54 would remain the same, namely one-fourth of the total number of slots in the motor core.

It should also be mentioned, however, that the machine described herein is not limited to filling 36 core slots. Twenty-four slots or some other commonly used number can easily be accommodated by this type of machine.

What is claimed is:

1. The method of preparing and inserting cells formed from a strip of material into various shaped slots of a motor core comprising the steps of intermittently feeding the strip of material, intermittently cutting variable length sections off of the strip of material, intermittently punching the cut off sections into an opening in a forming drum to produce a rough U-shaped form, slidably forcing each rough U-shaped section endwise through a tapered slot portion of the opening in the forming drum to form the rough U-shaped section into a section having a precise specific shape corresponding with the shape of one of the slots of the motor core, and pushing the precisely shaped section into a corresponding slot of the motor core.

2. The method of claim 1, including the step of transferring the precise shaped section in a transfer magazine to a location for the pushing step.

3. The method of claim 1, including the step of gripping the cut off sections immediately after said cutting step.

4. The method of claim 1, including the step of transferring the cut off sections to a location for said punching step.

5. The method of claim 1, including the step of simultaneously inserting all of the precisely shaped sections into the slots of the motor core.

6. The method of preparing and inserting cells formed from a strip of material into various shaped slots of a motor core comprising the steps of intermittently feeding the strip of material, intermittently cutting variable length sections off of the strip of material, intermittently forming each of the cut off sections into a U-shaped form by punching each section into a slot of a rotatable slotted element, more precise forming of each U-shaped section by longitudinal displacement of it through a tapered portion of said slot, to take the shape required for insertion into the motor core, and pushing, by means of a suitable push rod, the shaped section into a corresponding slot of the motor core.

7. The method of claim 6, including the step of transferring the cut off sections to location for said punching step by rotation of said element.

8. The method of claim 6, including the step of carrying the shaped section in a rotatable magazine to a location for said pushing step.

9. The method of claim 6 including the step of simultaneously inserting all of the precisely shaped sections into the slots of the motor core by means of an assembly of suitable shaped push rods.

* * * * *